United States Patent
Seeley et al.

(10) Patent No.: US 10,130,906 B2
(45) Date of Patent: Nov. 20, 2018

(54) PURIFICATION OF A GAS STREAM

(75) Inventors: Andrew James Seeley, Bristol (GB); Robert Bruce Grant, Steyning (GB)

(73) Assignee: Edwards Limited, Burgess Hill (GB)

( * ) Notice: Subject to any disclaimer, the term of this patent is extended or adjusted under 35 U.S.C. 154(b) by 1232 days.

(21) Appl. No.: 13/055,689

(22) PCT Filed: Jun. 24, 2009

(86) PCT No.: PCT/GB2009/050724
§ 371 (c)(1),
(2), (4) Date: Jan. 24, 2011

(87) PCT Pub. No.: WO2010/018390
PCT Pub. Date: Feb. 18, 2010

(65) Prior Publication Data
US 2011/0120184 A1    May 26, 2011

(30) Foreign Application Priority Data
Aug. 11, 2008 (GB) .................... 0814556.7

(51) Int. Cl.
*F25J 3/08* (2006.01)
*B01D 53/14* (2006.01)
(Continued)

(52) U.S. Cl.
CPC .............. *B01D 53/14* (2013.01); *C01B 3/506* (2013.01); *C01B 3/52* (2013.01); *F25J 3/0252* (2013.01);
(Continued)

(58) Field of Classification Search
CPC ................ B01D 53/14; B01D 53/1406; B01D 53/1418; D01D 2256/10; D01D 2257/55; F25J 2205/50
(Continued)

(56) References Cited

U.S. PATENT DOCUMENTS 2,792,903 A    5/1957   Hoff
2,806,552 A *  9/1957   Koble ............................ 62/635
(Continued)

FOREIGN PATENT DOCUMENTS

DE    10053345 A1    5/2002
EP     0203651 A3    5/1986
(Continued)

OTHER PUBLICATIONS

Translation of the First Office Action dated Nov. 21, 2012 in corresponding CN Application No. 200980131225.8, 4 pgs.
(Continued)

*Primary Examiner* — Brian King
(74) *Attorney, Agent, or Firm* — Shumaker & Sieffert, P.A.

(57) ABSTRACT

At least one gaseous impurity, for example silane, is removed by absorption from a feed gas stream, for example a gas stream comprising nitrogen and hydrogen, the gaseous impurity being less volatile than the feed gas stream. The absorption is effected by a sub-cooled absorbent at a first cryogenic temperature and a first pressure. The absorbent is typically propane. The absorption may be conducted in a liquid-vapor contact column (130). Absorbent containing impurity may be regenerated in a regeneration vessel 150 and returned to the column (130).

23 Claims, 3 Drawing Sheets

(51) Int. Cl.
*C01B 3/50* (2006.01)
*C01B 3/52* (2006.01)
*F25J 3/02* (2006.01)

(52) U.S. Cl.
CPC ............ *F25J 3/08* (2013.01); *B01D 2252/20* (2013.01); *B01D 2256/10* (2013.01); *B01D 2256/16* (2013.01); *B01D 2257/553* (2013.01); *B01D 2258/0216* (2013.01); *C01B 2203/0415* (2013.01); *C01B 2203/0465* (2013.01); *F25J 2205/30* (2013.01); *F25J 2215/10* (2013.01); *F25J 2280/10* (2013.01)

(58) Field of Classification Search
USPC .................................. 62/617, 636, 931, 607
See application file for complete search history.

(56) References Cited

U.S. PATENT DOCUMENTS

| | | | |
|---|---|---|---|
| 2,826,266 A | | 3/1958 | Hachmuth et al. |
| 3,121,624 A | * | 2/1964 | Matsch et al. .................. 95/175 |
| 3,266,220 A | | 8/1966 | Woertz |
| 4,100,259 A | | 7/1978 | Salaun et al. |
| 4,519,999 A | * | 5/1985 | Coleman et al. ............. 423/337 |
| 4,612,174 A | * | 9/1986 | Fabian et al. ................. 423/210 |
| 4,695,662 A | * | 9/1987 | Vora .............................. 585/324 |
| 4,888,035 A | | 12/1989 | Bauer |
| 4,934,146 A | | 6/1990 | Wilhelm et al. |
| 2002/0142130 A1 | * | 10/2002 | Irwin et al. ................... 428/137 |
| 2005/0126195 A1 | * | 6/2005 | Horn et al. .................. 62/238.6 |

FOREIGN PATENT DOCUMENTS

| | | | |
|---|---|---|---|
| EP | 0768365 A2 | * | 5/1986 |
| EP | 0203651 A2 | | 12/1986 |
| EP | 0203651 A2 | * | 7/1996 |
| GB | 728444 A | | 4/1955 |
| GB | 814759 A | | 6/1959 |
| SU | 00345716 A1 | | 9/1981 |
| WO | 2008068305 A2 | | 12/2008 |
| WO | 2008068305 A3 | | 12/2008 |

OTHER PUBLICATIONS

EP Communication pursuant to Rules 161(1) and 162 EPC dated Apr. 5, 2011, 2 pgs.
Response filed May 16, 2011 to EP Communication pursuant to Rules 161(1) and 162 EPC dated Apr. 5, 2011, 6 pgs.
Translation of RU Official Action dated Mar. 20, 2013 in corresponding RU Application No. 2011109002, 6 pgs.
Translation of RU Decision on Grant and Allowed Claims dated Mar. 24, 2011 in corresponding RU Application No. 2011109002, 3pgs.
English Translation of the Fourth Office Action from counterpart Chinese Patent Application No. 200980131225.8, dated Dec. 12, 2014, 9 pp.
English Translation of the Search Report from counterpart Chinese Patent Application No. 200980131225.8, dated Dec. 12, 2014, 2 pp.
English Translation of Third Office Action from counterpart Chinese Patent Application No. 200980131225.8, dated Jun. 4, 2014, 10 pp.

* cited by examiner

PURIFICATION OF A GAS STREAM

This invention relates to a method of and apparatus for removing at least one gaseous impurity from a feed gas stream, the said gaseous impurity being volatile than the gas from which it is to be removed.

A wide range of different methods are available for the purification of gas streams. These methods include separation of the impurity or impurities by pressure swing adsorption, by semi-permeable membranes and by fractional distillation. It is also known to absorb the impurities in a solvent at ambient temperatures. Other purification methods involve condensing or freezing the impurities out of a feed gas stream. Some of these methods require the use of special materials, for example, selective adsorbents, membranes or absorbents. These and other methods may also require the expenditure of considerable energy in compressing the feed gas stream, or in generating a regeneration gas stream to purge or otherwise remove the impurities from a vessel or vessels in which these impurities are disengaged from the feed gas stream.

There therefore remains a need for new gas purification methods and apparatus. For example, in the manufacture of solar cells, an effluent gas stream containing hydrogen contaminated with silane ($SiH_4$) and possibly also with phosphine ($PH_3$) and borane ($B_2H_6$) is produced. Typically there are in the order of 1-2% by volume of impurities in this effluent gas stream.

It is an aim of the present invention to provide a method of and apparatus for removing at least one gaseous impurity from a feed gas stream, the said gaseous impurity being less volatile than the feed gas stream.

According to the present invention there is provided a method of removing at least one gaseous impurity from a feed gas stream, the said gaseous impurity being less volatile than the feed gas stream, comprising absorbing the said gaseous impurity in a sub-cooled liquid absorbent at a first cryogenic temperature and a first pressure and thereby producing a purified feed gas stream.

The invention also provides apparatus for performing a method as defined in the paragraph immediately above, the apparatus comprising at least one liquid-gas contact column arranged for intimate contact of a gas phase with a liquid phase, an inlet to the column for a feed gas stream to be purified, the feed gas stream containing at least one gaseous impurity which is less volatile than the feed gas, a first heat exchanger for sub-cooling a liquid absorbent to a first cryogenic temperature, a distributor in the column for the sub-cooled liquid absorbent, and an outlet for a purified gas stream.

The absorbent is typically sub-cooled to a temperature at which its vapour pressure is less than 1 mm Hg (133.3 Pa). This keeps to a minimum any entry of the vapour phase of the absorbent into the feed gas stream.

The choice of the absorbent depends on the composition of the feed gas stream and of the impurities. The impurities may comprise at least one gaseous hydride, for example, silane. In the example of the removal of silane impurity from hydrogen, the absorbent may be propane. In this example, the first cryogenic temperature is typically in the range of the freezing point of propane at the first pressure to minus 140° C., and preferably in the range of minus 170° C. to minus 150° C. In general, the lower the first cryogenic temperature, the greater is the specific capacity of the absorbent for dissolved silane. It is believed that about 99.9% of the silane in the feed gas stream may be removed at a first cryogenic temperature of about minus 170° C.

The first pressure is typically and conveniently atmospheric pressure.

Propane may also be used as the absorbent for the removal of phosphine ($PH_3$) and borane ($B_2H_6$) impurities from hydrogen.

Absorbent containing the absorbed impurities is desirably regenerated, and can be returned to absorption duty. The absorbent may be regenerated by subjecting it to a second cryogenic temperature higher than the first cryogenic temperature and a second pressure typically less than the first pressure. In a typical arrangement absorbent containing absorbed impurities is continuously collected and one part of the collected absorbent is continuously recycled for fresh contact with the feed gas stream and a second part of the collected absorbent is continuously sent for regeneration.

The first pressure is typically atmospheric pressure and the second pressure may be established by operation of a vacuum pump. If it is desired to avoid a sub-atmospheric pressure, the regeneration of the absorbent can be performed at a second pressure that is the same as the first pressure and a second cryogenic temperature higher than the first cryogenic temperature by passing a stripping gas stream through the absorbent containing the absorbed impurities. The stripping gas stream may, for example, comprise nitrogen or hydrogen.

The feed gas stream is preferably precooled upstream of the absorbing of the impurities. The precooling is preferably performed by (indirect) heat exchange with the purified feed gas stream. A second heat exchanger or regenerator may be used for this purpose.

The liquid-gas contact column may contain a packing to effect the intimate contact of the gas phase with the liquid phase. The packing may be a structured packing or a random packing.

Regeneration of the absorbent containing the absorbed impurities inevitably results in the loss of some of the absorbent. Such loss can be kept down if the absorption of the impurities in two discrete stages, whereas a partially purified feed gas stream is produced in the first stage, absorbent from the first stage is regenerated, and the regenerated absorbent is employed in the second stage to complete the purification of the feed gas stream. Because the first stage produces only a partially purified feed gas stream (typically from 85 to 95% of the total amount of the said impurity is removed therein) less absorbent may be used in the first stage than in a single stage method and therefore less absorbent is presented for regeneration, thus making possible to keep down loss of the absorbent.

The apparatus according to the invention may therefore comprise a first liquid-gas contact column having an inlet for the feed gas stream to be purified, a distributor for the sub-cooled liquid absorbent, a first outlet for a partially purified feed gas stream communicating with a second liquid-gas contact column, and a second outlet for absorbent containing absorbed impurity communicating separately with the distributor and with a regeneration column for disengaging the absorbed impurity from the said absorbent containing absorbed impurity; and a second liquid-gas contact column having an inlet for the partially purified feed gas stream, a distributor for the sub-cooled liquid absorbent, a first outlet for the purified feed gas stream, and a second outlet for absorbent containing absorbed impurity, wherein the distributor of the second liquid-gas contact column communicates both with the second outlet of the second liquid-gas contact column and with an outlet for regenerated absorbent from the regeneration column.

The absorbent is preferably sub-cooled by heat exchange with a suitable heat exchange medium. The heat exchange medium is typically nitrogen at a suitable cryogenic temperature. Since liquid nitrogen has a boiling point at atmospheric temperature of approximately minus 196° C., whereas the absorbent is generally used at a higher temperature than this, the heat exchange medium may be formed by mixing liquid nitrogen with superheated vaporised nitrogen. The heat exchange may typically be performed in a bottom region of the said gas-liquid contact column or externally of the said gas-liquid contact column.

If the second pressure, that is the pressure at which the absorbent is regenerated, is lower than the first pressure, that is the pressure at which the said impurity is absorbed from the feed gas stream, regenerated absorbent may be raised to the first pressure again upstream of return to the said gas-liquid contact column. A mechanical pump may be used for this purpose. Alternatively, the regenerated absorbent may be sent to a holding vessel and the pressure therein raised (to a level suitable for its return to the liquid-vapour contact column) by natural or forced evaporation of the absorbent.

The method and apparatus according to the invention may be used to purify hydrogen by removal of, for example, silane, borane and phosphine impurities to a standard to make the purified hydrogen suitable for use as a fuel in a fuel cell of the PEM kind.

The method and apparatus according to the invention will now be described by way of example with reference to the accompanying drawings, in which.

Figure 1:
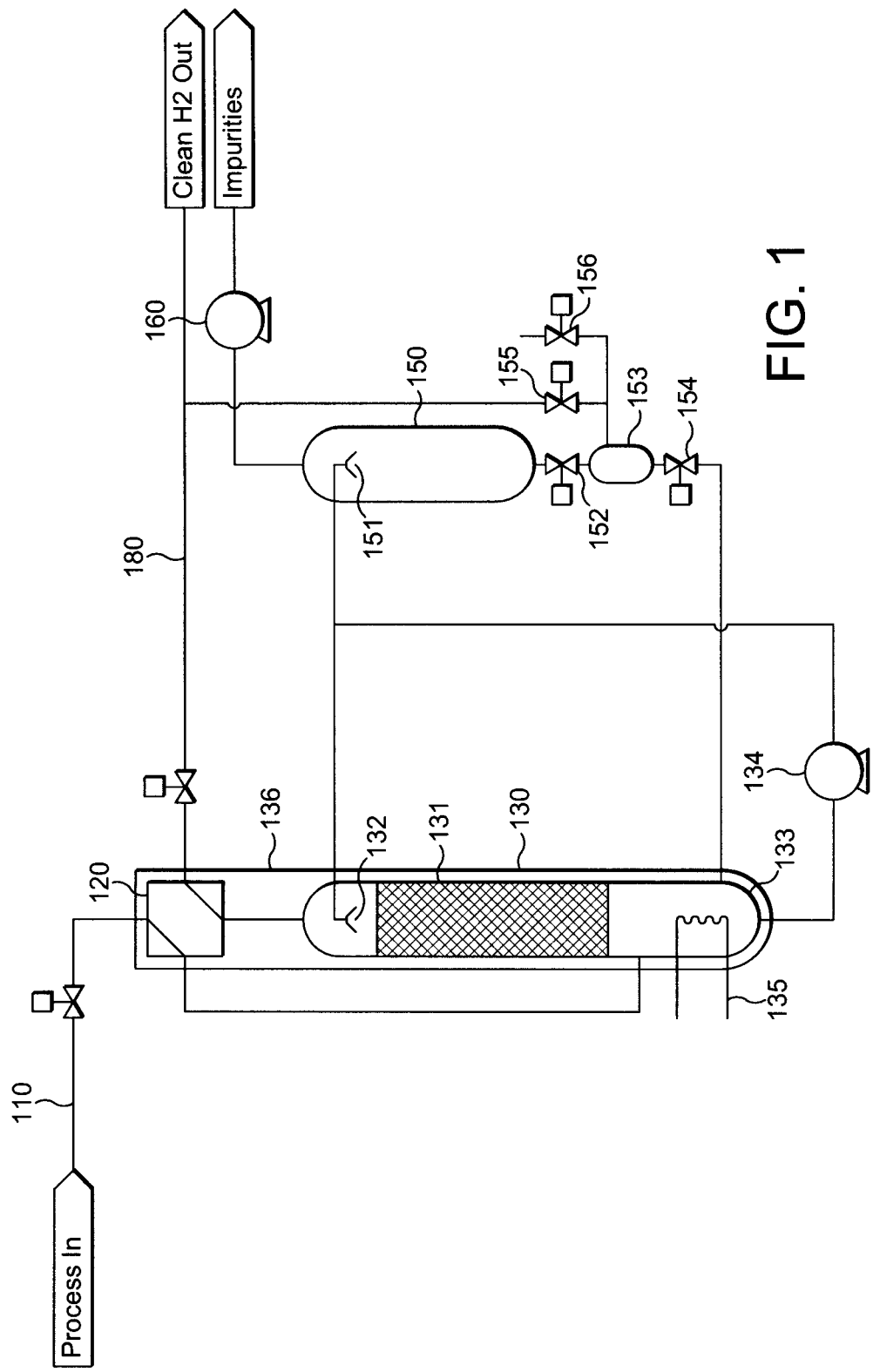
FIG. 1 is a schematic flow diagram of a first hydrogen purifier.

The drawings are not to scale.

Like parts in the different Figures are indicated therein by the same reference numerals.

Referring to FIG. 1, the illustrated apparatus comprises a packed liquid-vapour contact column (or tower) 130 and a stripping column (or vessel) 150. An exhaust gas stream comprising hydrogen and nitrogen as its two main components, but also comprising a relatively small proportion, typically up to 1 or 2% by volume, of one or more gaseous hydrides such as silane, flows along an inlet pipeline 110 to a cooling unit 120. The source of the exhaust gas stream may be a manufacturing process in which the impurity is used as a reactant. One example of such a manufacturing process is the manufacture of solar cells, in which process silane, and sometimes also borane and phosphine, are used as reactants.

The exhaust gas stream typically enters the unit 120 at a temperature in the range of 0 to 50° C. and a pressure in the range of 1-2 bar.

The unit 120 is preferably a heat exchange in which the incoming gas stream is reduced in temperature by indirect heat exchange with an outgoing cold gas stream, the formation of which will be described below. The unit 120 may alternatively comprise a pair of regenerators or recuperators. In such an arrangement one member of the pair is cooled by the outgoing gas stream while the other member of the pair (which has previously been precooled itself) is used to cool the incoming gas stream. As the source of the cold gas stream is in fact the column 130, which operates at a cryogenic temperature, the incoming gas stream is cooled to a cryogenic temperature at or close to the operating temperature of the column 130. The cooled incoming gas stream enters the column 130 through an inlet 112 at or near its bottom. The cooled incoming gas stream ascends the column 130, passing through one or more typically a plurality of beds 131 of a packing. The packing may be a random packing, comprising, for example, Pall rings, or a structured packing. As it ascends the beds 131 of packing, the ascending gas comes into intimate contact with a descending liquid phase. The packing has a configuration that facilitates this contact. Any commercial packing sold for use in liquid-vapour contact columns may be used for this purpose.

The liquid phase that is employed in the liquid-vapour contact column 130 is a sub-cooled absorbent that readily dissolves the hydride impurity in the incoming gas stream so as essentially to free the gas stream of that impurity. The solvent is typically propane. Sub-cooling the propane reduces its vapour pressure and thereby keeps down propane contamination of the gas stream while at the same time increasing the quantity of hydride it can dissolve. The propane that is used as the liquid phase in the liquid-vapour contact column 130 is typically sub-cooled to a cryogenic temperature (i.e. one not greater than minus 200° C.) in the range of minus 155° to minus 170° C., or lower, but typically above the freezing point of propane.

Propane is particularly suited for use as the absorbent or solvent in the method according to the present invention because it can be sub-cooled to temperatures approaching the normal boiling point of liquid nitrogen (minus 196° C.) without freezing, such low temperatures facilitating the dissolution of hydride impurities. In addition, propane is a non-polar molecule without a dipole moment and is therefore suited for the dissolution of similarly non-polar molecules such as silane and borane. Propane also has a very low vapour pressure at temperatures in the order of minus 170° C. and therefore any contamination of the gas to be purified with the propane is minimal.

The desired low temperatures can readily be achieved by means of heat exchange with a stream of cold nitrogen gas. The cold nitrogen gas stream can be produced at the required temperature by the controlled vaporisation of liquid nitrogen (boiling point minus 196° C.) to give it the required degree of superheat. For example, a stream of liquid nitrogen can be mixed with a stream of gaseous nitrogen. As shown in FIG. 1, the liquid-vapour contact column 130 has a sump 133 which is adapted to receive liquid propane. The sump is provided with a cooling coil 135. At start-up the cold nitrogen may be passed through the cooling coil 135 so as to reduce the temperature of the liquid propane to a desired value. The passage of the cold nitrogen through the cooling coil is typically continued throughout operation of the apparatus shown in FIG. 1 so as to compensate for the absorption of heat ('heat inleak') from the surrounding environment. In order to keep down this heat inleak, the assembly of heat exchange unit 120 and liquid-vapour contact column is typically located with an insulating jacket 136, for example a vacuum-insulating jacket.

A stream of the sub-cooled liquid propane is continuously withdrawn from the sump 133 of the liquid-vapour contact column 130 by operation of a pump 134. The stream of sub-cooled liquid propane is divided into two subsidiary streams. The larger of the two subsidiary streams is sent to a distributor 132 located within the liquid-vapour contact column 130 above the bed or beds 131 of packing. Sub-cooled liquid propane is distributed uniformly throughout the bed or beds 131 of packing. It absorbs or dissolves the hydride impurity or impurities from the exhaust gas stream, the concentration of impurities therein increasing as it descends. Analogously, the exhaust gas stream becomes progressively leaner in impurities as it ascends the bed or beds 131 of packing. An essentially pure gas stream comprising hydrogen and nitrogen flows out of the top of the liquid-vapour contact column 130. It is this gas stream which is used for cooling purposes in the unit 120, the pure gas stream thereby being warmed to approximately ambient temperature. The purified gas stream may be collected as product from pipeline 180 and may, for example, be used as a fuel stream in a fuel cell.

The liquid propane containing absorbed impurity or impurities passes from the bed or beds 131 of packing into the sump 133. In order to prevent the build up of the absorbed impurities, the smaller of the two subsidiary streams of sub-cooled liquid propane is passed to a stripping vessel 150, in which the impurity is stripped or disengaged from the liquid propane. The thus purified liquid propane is typically returned to the sump 133 of the liquid-vapour contact column 130. The stripping of the impurity in the vessel 150 may be brought about by subjecting the liquid therein to a higher temperature and/or lower pressure than obtained in the liquid-vapour contact column 130. Alternatively or in addition, a stripping gas such as nitrogen can be employed. The apparatus shown in FIG. 1, however, relies merely on a combination of higher temperature and lower pressure to effect stripping of the absorbed gas from the liquid propane and hence the regeneration of the liquid propane. As depicted in FIG. 1, the minor subsidiary stream of sub-cooled liquid propane is fed into the stripping vessel 150 through a distributor 151 in the form of a spray nozzle 151. The temperature is allowed to rise in the stripping vessel 150 such that vapour, comprising a concentrated mixture of hydride impurity in vaporised liquid propane solvent form. The formation of this vapour phase takes place under vacuum, the vapour being continuously withdrawn by a vacuum pump 160. The vacuum pump 160 may be a plural stage dry vacuum pump comprising a number of roots and claw stages.

At the absorption temperature, the respective vapour pressures of propane and, say, silane ($SiH_4$) are very low. However, if the temperature in the stripping vessel is allowed to rise to, say, minus 140° C. both silane and propane will have increased vapour pressures, the vapour pressure of silane being the greater. The stripping vessel is operated so as to ensure that the rate of removal of the impurities is equal to the rate at which they flow into the apparatus in the exhaust gas stream. In general, the higher the stripping temperature, the greater the rate of loss of propane in the vapour extracted by the vacuum pump 160. We believe that at a stripping temperature in the order of minus 140° C. and a stripping pressure of about 0.5 torr the loss of propane can be kept to an acceptable proportion of the hydrogen in the exhaust gas stream (e.g. less than 10%). At a higher stripping temperature, however, the proportion of propane that is lost is expected to increase. Moreover, the operating temperatures of the liquid-vapour contact column 130 and the stripping vessel 150, and the relative sizes of the major subsidiary stream of sub-cooled liquid propane that is sent to the column 130 and the minor subsidiary stream thereof that is sent to the vessel can be optimised so as to obtain the lowest energy consumption (taking into account propane losses) without compromising hydrogen purity.

The vacuum pump 160 preferably raises the pressure of the vapour extracted from the stripping vessel 150 to at least atmospheric pressure so that it can be further treated. Typically it is simply incinerated.

If desired, the stripping vessel may contain one or more beds of packing. The purified liquid propane is withdrawn from the bottom of the stripping vessel 150 and is returned to the sump 133 of the liquid-vapour contact column 130. A mechanical pump (not shown) may be used to repressurise the returning liquid propane. If desired, the returning liquid propane may be cooled to the operating temperature of the liquid-vapour contact column by heat exchange with cold nitrogen gas in a heat exchanger (not shown) externally of the column 130. Alternatively, the flow of cold nitrogen gas through the cooling coil 135 may be adjusted so as to give the desired degree of sub-cooling. A mechanical pump for the returning liquid propane may, however, be eliminated from the process by using the pressure of a gas to effect the transfer. Such an arrangement is illustrated in FIG. 1. The purified liquid propane passes from the bottom of the stripping vessel 150 to a holding vessel 153 which is isolated from the sump 133 of the column 130 by a stop valve 154. Once a chosen volume of liquid propane has been collected in the holding vessel 153, a further stop valve 152 intermediate the vessels 150 and 153 is closed. A transfer gas is then admitted to the holding vessel 153. The transfer gas may be taken from the purified stream of exhaust gas. A stop valve 155 is opened so as to place the purified gas stream in communication with the ullage or head space of the holding vessel 153. Alternatively, the transfer gas may come from an external source and enter the holding vessel through a stop valve 156. In either alternative a pressure in the ullage space of the transfer vessel sufficient to effect the transfer of the purified liquid propane to the sump 133 of the column 130 when the stop valve 154 is opened.

The apparatus shown in FIG. 1 can be used to purify effectively a gas stream comprising hydrogen or a mixture of hydrogen and nitrogen by removal therefrom of one or more gaseous hydride impurities such as silane, borane, and phosphine. In a typical example, the level of impurity might be reduced from 10,000 parts per million by volume to 10 parts per million by volume.

Figure 2:
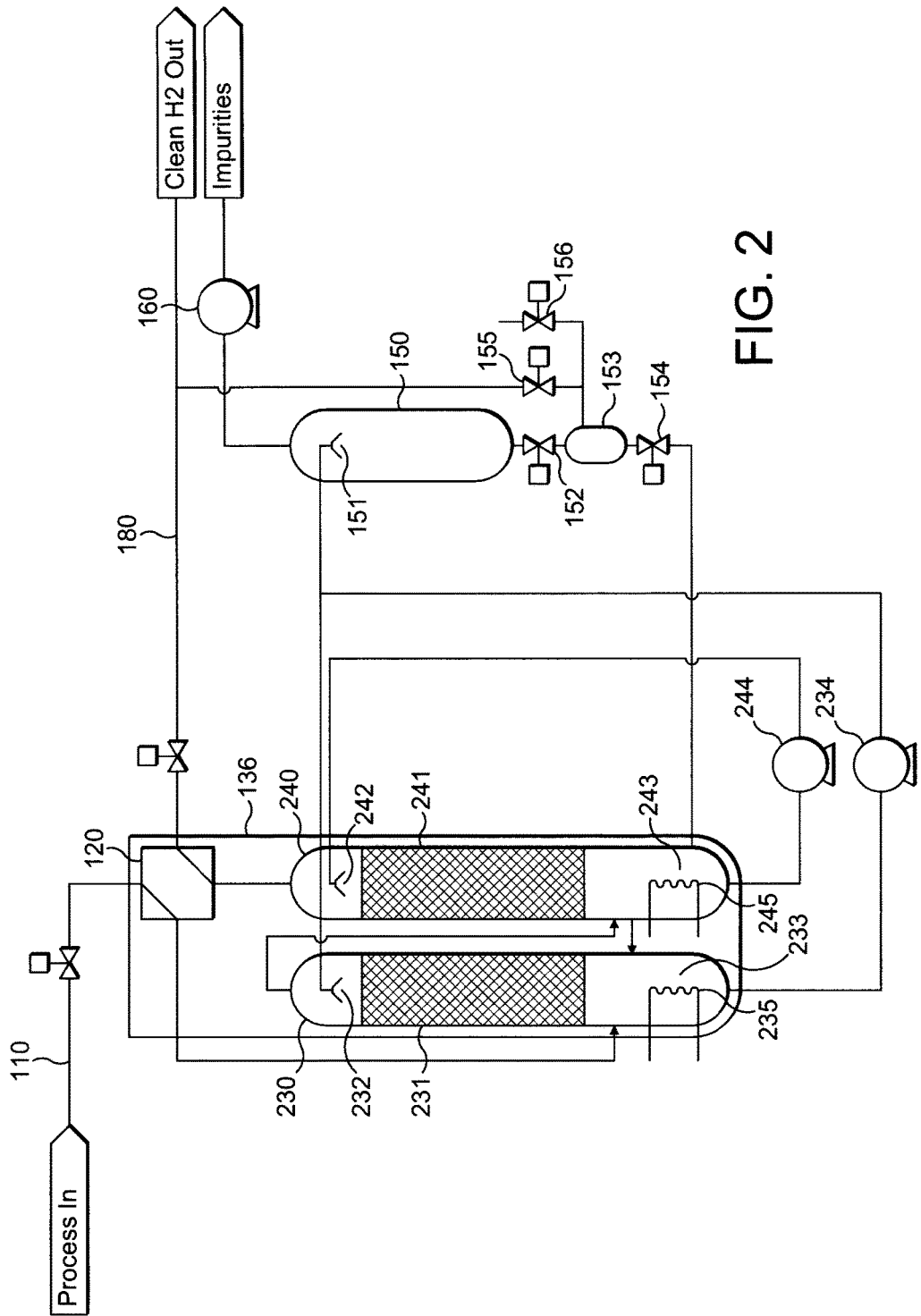
FIG. 2 is a schematic flow diagram of a second hydrogen purifier.

Referring now to FIG. 2 of the drawings, there is shown an alternative purification apparatus in which two absorption columns are employed so as to enable a more concentrated solution of hydride impurity in liquid propane to be sent to the stripping vessel 150. Now the precooled stream of exhaust gas flows from the cooling unit 120 to a first liquid-vapour contact column 230. The configuration of the column 230 is analogous so that of the liquid-vapour contact column 130 shown in FIG. 1. The column 230 has one or more beds 231 of packing located below a distributor 232 and above a sump 234 in which a cooling coil 235 is located. Gas to be purified enters the column 320 below bed or beds of packing 231 and is intimately contacted with sub-cooled liquid propane which is pumped by pump 234 from the sump 233 to the distributor 232. A sufficient flow of cold nitrogen is passed through the cooling coil 235 to maintain the liquid propane at a chosen temperature. Analogously to the operation of the apparatus shown in FIG. 1, not all of the sub-cooled liquid propane passing through the pump 234 is sent to the distributor 232. Some of it is sent to the stripping vessel 150. One main difference between the operation of the column 230 of the apparatus shown in FIG. 2 and that of the column 130 in the apparatus shown in FIG. 1 is that no attempt is made to remove all the gaseous hydride impurity from the column 230. Typically only about 90% of the impurity is removed. In consequence, the solution of hydride in liquid propane passing to the stripping vessel 150 is now more concentrated. As a result the partial pressure of the silane or other hydride in the vapour space of the stripping column 150 is much greater. As a consequence, the proportion of propane in the gas extracted by the vacuum pump 160 is much lower, and therefore loss of propane from the apparatus is reduced. Further the demand for vacuum pumping is reduced and it may therefore be possible to use a smaller vacuum pump 160.

A second main difference between the apparatuses shown in FIGS. 1 and 2 is that the purified gas from the column 230 is not taken as product but is sent to a second liquid-vapour contact column 240 which has an analogous configuration to the column 230. Thus the column 240 has one or more beds of packing 241 below a distributor 242 and above a sump 243. Liquid propane in the sump 243 is maintained at a chosen temperature in sub-cooled state by passage of cold nitrogen through the coil 245.

In operation, the second liquid-vapour contact column 240 is used to remove essentially all of the residual gaseous hydride impurity from the partially purified exhaust gas stream exiting from the top of the column 230. The partially purified gas stream enters the column 240 below the bed or beds 241 of packing and has gaseous hydride impurity absorbed therefrom by descending liquid propane absorbent which is recirculated by operation of a pump 244 from the sump 243 to the distributor 242. Typically, none of the liquid which is recirculated by the pump 244 passes to the stripping vessel 150. Return of purified liquid propane from the holding vessel 153 to the sump 243 enables build up of impurities in the recirculating liquid to be controlled. The second column 240 is typically provided with a balance pipe to enable excess liquid propane to overflow from the sump 243 into the sump of the first column 230.

The purified gas from the top of the liquid-vapour contact column 240 is used to cool the cooling unit 120 and taken as product from the pipeline 180.

Figure 3:
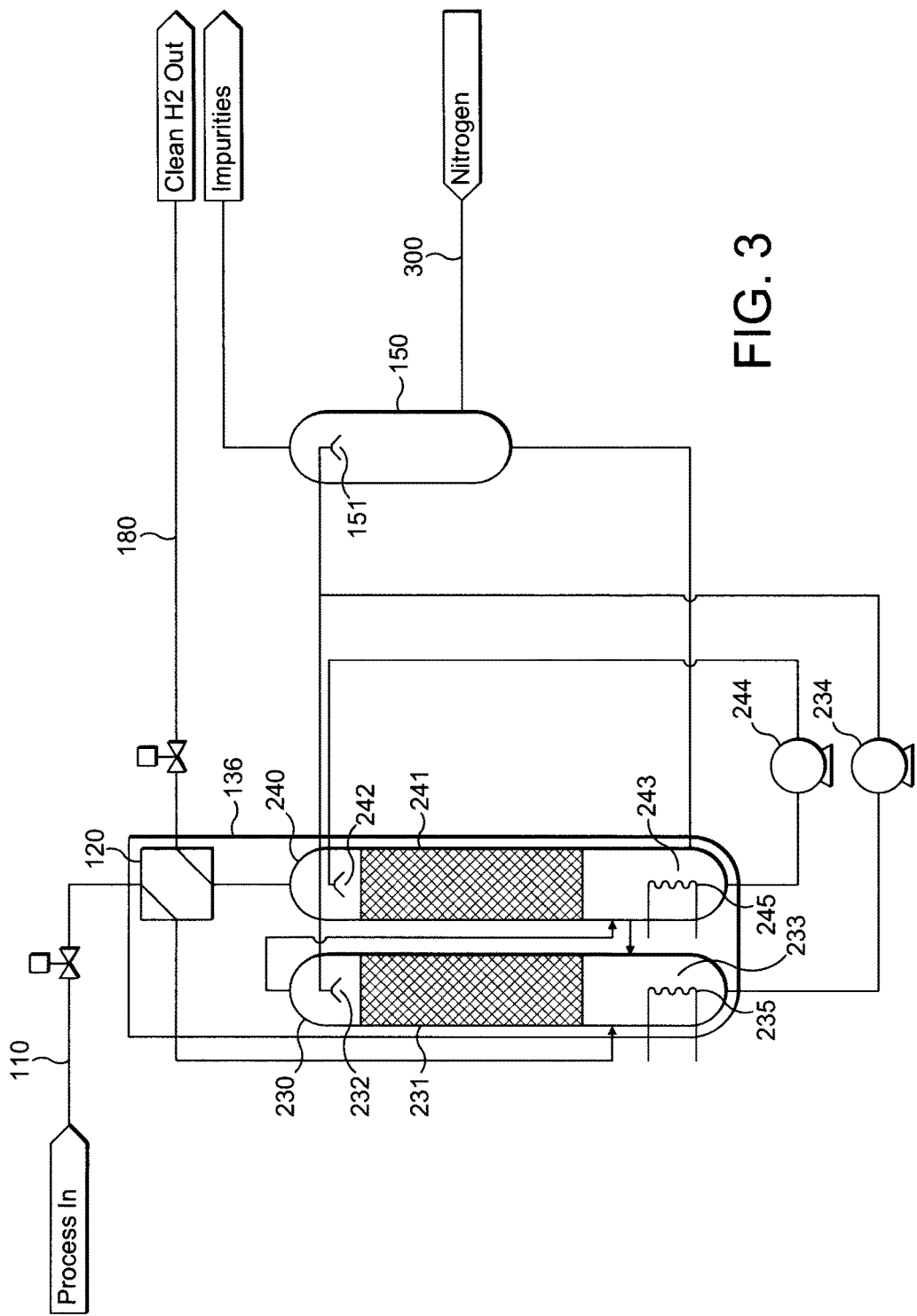
FIG. 3 is a schematic flow diagram of a third hydrogen purifier.

The apparatus shown in FIG. 3 of the drawings is similar to that shown in FIG. 2, save that now the stripping vessel 150 is operated at essentially the same pressure as the columns 230 and 240 (e.g. at approximately atmospheric pressure). No vacuum pump 160 is therefore required. In order to strip absorbed or dissolved gaseous hydrides such as silane from the liquid propane in the stripping vessel 150, a flow of stripping gas, typically nitrogen is passed along a pipeline 300 into the bottom of the stripping vessel 150. Because the stripping column 150 now operates at the same pressure as the liquid-vapour contact columns 230 and 240 there is no need to pressurise the purified propane to effect its transfer to the sump 243 of the column 240. Instead, the stripping vessel 150 is positioned at a sufficient elevation to enable the transfer to be effected by gravity. Thus, the holding vessel 153 and its associated valves 152, 154, 155 and 156 are not used in the apparatus shown in FIG. 3. In other respects, the operation and configuration of the apparatus shown in FIG. 3 is analogous to that shown in FIG. 2.

Various changes, modifications and additions may be made to each of the apparatuses shown in the drawing. For example, various flow control, non-return and isolation valves may be employed adopting criteria well known in the art. For example, a first isolation valve (not shown) may be located in the exhaust gas or inlet pipeline 110 and a second isolation valve in the product gas pipeline 180. Thus the propane may be entirely contained by closing the two isolation valves in the event of a cooling system malfunction. Further, each of the apparatuses shown in the drawings may be provided at chosen locations with valved purge lines (not shown) to enable purging with a gas such as nitrogen that does not react chemically under prevailing conditions.

The invention claimed is:

1. A method for removing at least one gaseous impurity comprising a hydride, from a feed gas stream comprising nitrogen and hydrogen, the gaseous impurity being less volatile than the feed gas stream, the method comprising absorbing the gaseous impurity in a sub-cooled liquid propane at a cryogenic temperature and a pressure of one to two bar to remove the at least one gaseous impurity from the feed gas stream to produce a purified feed gas stream comprising nitrogen and hydrogen.

2. The method of claim 1, wherein the liquid propane is sub-cooled to a temperature at which its vapor pressure is less than 1 mm Hg.

3. The method of claim 1, wherein the hydride comprises silane.

4. The method of claim 3, wherein the at least one gaseous impurity further comprises at least one of borane ($B_2H_6$) or phosphine.

5. The method of claim 1, wherein the cryogenic temperature is in the range of negative 155° C. to negative 170° C.

6. The method of claim 1, wherein the cryogenic temperature comprises a first cryogenic temperature, the method further comprising regenerating the liquid propane by subjecting it to a second cryogenic temperature higher than the first cryogenic temperature.

7. The method of claim 6, wherein the pressure comprises a first pressure, and wherein the liquid propane is regenerated at a second pressure lower than the first pressure.

8. The method of claim 6, wherein the pressure comprises a first pressure, and wherein the liquid propane is regenerated at a second pressure that is the same as the first pressure by passing a stripping gas stream through the liquid propane containing the absorbed gaseous impurity.

9. The method of claim 8, wherein the stripping gas stream comprises nitrogen or hydrogen.

10. The method of claim 6, further comprising returning the regenerated liquid propane to absorption duty.

11. The method of claim 6, wherein absorption of the gaseous impurity includes a first stage and a second stage, wherein a partially purified feed gas stream is produced in the first stage, further comprising regenerating the propane from the first stage, and employing the regenerated liquid propane in the second stage.

12. The method of claim 1, further comprising providing the feed gas stream upstream of the absorbing of the gaseous impurity.

13. The method of claim 1, further comprising sub-cooling the liquid propane by heat exchange with a heat exchange medium.

14. The method of claim 1, wherein the feed gas stream is an exhaust gas stream from a process for making solar cells and the purified feed gas stream is employed as a fuel in a fuel cell of the PEM kind.

15. An apparatus comprising at least one liquid-vapor contact column arranged for intimate contact of a gas phase with a liquid phase, the column including:
   an inlet configured to receive a feed gas stream to be purified, the feed gas stream comprising nitrogen and hydrogen and containing at least one gaseous impurity which is less volatile than the feed gas, wherein the at least one gaseous impurity comprises a hydride;
   a first heat exchanger configured to sub-cool a liquid propane to a cryogenic temperature;
   a distributor in the column configured to distribute the sub-cooled liquid propane; and an outlet for a purified feed gas stream, wherein the at least one liquid-vapor column is configured to remove the at least one gaseous impurity from the feed gas stream by absorbing the gaseous impurity in the subcooled liquid propane at the first cryogenic temperature and a pressure of one to two bar to produce the purified feed gas stream comprising nitrogen and hydrogen.

16. The apparatus of claim 15, wherein the at least one liquid-vapor contact column contains a packing to effect the intimate contact of the gas phase with the liquid phase.

17. The apparatus of claim 15, further comprising a regeneration column for regenerating liquid propane which contains the at least one gaseous impurity.

18. The apparatus of claim 17, further comprising a holding vessel for regenerated liquid propane and means for raising the pressure in the holding vessel by natural or forced vaporization of the regenerated liquid propane.

19. The apparatus of claim 15, further comprising a second heat exchanger or a regenerator for precooling the feed gas stream by heat exchange with the purified gas stream.

20. The method of claim 1, wherein the purified feed gas stream is essentially free of the at least one impurity.

21. The method of claim 1, wherein the purified feed gas stream includes less than 10 parts per million by volume of the at least one impurity.

22. The apparatus of claim 15, wherein the purified feed gas stream is essentially free of the at least one impurity.

23. The apparatus of claim 15, wherein the purified feed gas stream includes less than 10 parts per million by volume of the at least one impurity.

* * * * *